(12) United States Patent
Inamo

(10) Patent No.: US 11,836,766 B2
(45) Date of Patent: Dec. 5, 2023

(54) INFORMATION PROVIDING METHOD, INFORMATION PROVIDING SYSTEM AND STORAGE MEDIUM STORING PROGRAM

(71) Applicant: Good Create Inc., Marugame (JP)

(72) Inventor: Hiroshi Inamo, Kagawa (JP)

(73) Assignee: GOOD CREATE INC., Marugame (JP)

( * ) Notice: Subject to any disclaimer, the term of this patent is extended or adjusted under 35 U.S.C. 154(b) by 77 days.

(21) Appl. No.: 17/698,084

(22) Filed: Mar. 18, 2022

(65) Prior Publication Data

US 2022/0207574 A1 Jun. 30, 2022

Related U.S. Application Data

(63) Continuation of application No. PCT/JP2020/035327, filed on Sep. 17, 2020.

(30) Foreign Application Priority Data

Sep. 30, 2019 (JP) .................................. 2019-178436

(51) Int. Cl.
*G06Q 30/02* (2023.01)
*H04L 51/00* (2022.01)
*H04L 51/42* (2022.01)
*G06Q 30/0207* (2023.01)

(52) U.S. Cl.
CPC ..... *G06Q 30/0281* (2013.01); *G06Q 30/0207* (2013.01); *H04L 51/42* (2022.05)

(58) Field of Classification Search
None
See application file for complete search history.

(56) References Cited

U.S. PATENT DOCUMENTS

| 2002/0103781 | A1 | 8/2002 | Mori et al. | |
| 2004/0162913 | A1* | 8/2004 | Halahmi | G06Q 10/107 709/236 |
| 2007/0050812 | A1 | 3/2007 | Ebata et al. | |
| 2013/0212200 | A1* | 8/2013 | Dennis | H04L 67/1095 709/206 |
| 2014/0316896 | A1* | 10/2014 | McMillan | G06Q 30/0261 705/14.58 |

(Continued)

FOREIGN PATENT DOCUMENTS

| JP | 2002-229991 A | 8/2002 |
| JP | 2007-058610 A | 3/2007 |

(Continued)

OTHER PUBLICATIONS

International Search Report, International Application No. PCT/JP2020/035327, dated Nov. 24, 2020, 2 pages.

*Primary Examiner* — Vincent M Cao
(74) *Attorney, Agent, or Firm* — Rankin, Hill & Clark LLP

(57) ABSTRACT

An information providing method includes the steps, executed by a computer capable of acquiring provision information, of acquiring identification information that is a trigger for acquiring the provision information, creating account data for accessing a mailbox that stores the provision information, on the basis of the identification information, acquiring the provision information stored in the mailbox by using the created account data and a predetermined code, and displaying the acquired provision information on a display part.

19 Claims, 9 Drawing Sheets

(56) References Cited

U.S. PATENT DOCUMENTS

2016/0269440 A1* 9/2016 Hartman .................. H04L 51/42
2018/0115506 A1* 4/2018 Inamo .................... H04L 61/301
2020/0068352 A1   2/2020 Yamada et al.

FOREIGN PATENT DOCUMENTS

| JP | 2018-046570 A | 3/2018 |
| WO | 2016/171277 A1 | 10/2016 |
| WO | 2018/142680 A1 | 8/2018 |

* cited by examiner

| Identification information | E-mail account | Provision information |
|---|---|---|
| Store A | shop-A@message.com | Today's special offer is α cosmetics. |
| Store B | shop-B@message.com | Time sale starts at 12 p.m.! |
| Store C | shop-C@message.com | You've got a coupon for product β ! |
| Restaurant X | res-X@message.com | This month's special |
| Restaurant Y | res-Y@message.com | Lunch coupon |
| ... | ... | ... |

FIG. 2

| Identification information | Strength | E-mail account | Message |
|---|---|---|---|
| Store A | Weak | shop-A-01@message.com | Event information |
| Store A | Medium | shop-A-02@message.com | Time sale starts at 12 p.m.! |
| Store A | Strong | shop-A-03@message.com | Recipe for tomato |
| Store B | Weak | shop-B-01@message.com | Coupon |
| Store B | Medium | shop-B-02@message.com | Bargain information |
| Store B | Strong | shop-B-03@message.com | Merchandise guide |
| ... | ... | ... | ... |

FIG. 4

| Identification information | Time | E-mail account | Provision information |
|---|---|---|---|
| Store A | 10-12 | shop-A-1012@message.com | Event information |
| Store A | 12-14 | shop-A-1214@message.com | Restaurant guide |
| Store A | 14-16 | shop-A-1416@message.com | Café coupon |
| Store A | 16-18 | shop-A-1618@message.com | Dinner recipies |
| Store A | 18-20 | shop-A-1820@message.com | Time sale information |
| ... | ... | ... | ... |

FIG. 5

| Identification information | set type | E-mail account | Provision information |
|---|---|---|---|
| Store A | Coupon information | shop-A-cp@message.com | Coupon |
| Store A | Time sale information | shop-A-sale@message.com | Time sale information |
| Store A | Event information | shop-A-event@message.com | Event information |
| Store A | Sales place information | shop-A-map@message.com | Sales place information |
| Store A | Advertisement information | shop-A-adv@message.com | Advertisement |
| ... | ... | ... | ... |

FIG. 6

INFORMATION PROVIDING METHOD, INFORMATION PROVIDING SYSTEM AND STORAGE MEDIUM STORING PROGRAM

CROSS-REFERENCE TO RELATED APPLICATIONS

The present application is a continuation application of International Application number PCT/JP2020/035327, filed on Sep. 17, 2020, which claims priority under 35 U.S.C. § 119(a) to Japanese Patent Application No. 2019-178436, filed on Sep. 30, 2019. The contents of these applications are incorporated herein by reference in their entirety.

BACKGROUND OF THE INVENTION

The present disclosure relates to an information providing method, an information providing system, and a storage medium storing a program for providing information to a user.

PCT International Publication No. WO2018/142680 discloses a system in which a terminal that receives a beacon emitted by a device installed in a store accesses a Uniform Resource Locator (URL) contained in the beacon to acquire information.

In order to provide information using a conventional system, each information provider needs to prepare a server corresponding to a URL contained in the beacon, and store contents written in a markup language such as HTML in the server. Therefore, a burden on the information provider has been large.

BRIEF SUMMARY OF THE INVENTION

The present disclosure focuses on this point, and an object thereof is to provide an information providing method, an information providing system, and a storage medium storing a program that can reduce a burden of an information provider who provides information.

A first aspect of the present disclosure provides an information providing method including the steps, executed by a computer capable of acquiring provision information, of acquiring identification information that is a trigger for acquiring the provision information, creating account data for accessing a mailbox that stores the provision information, on the basis of the identification information, acquiring the provision information stored in the mailbox by using the created account data and a predetermined code, and displaying the acquired provision information on a display part.

A second aspect of the present disclosure provides an information providing system including a computer that is capable of acquiring provision information provided from an information providing apparatus that provides information, and a message transfer agent that includes a plurality of mailboxes storing the provision information, wherein the computer includes an identification information acquisition part that acquires identification information that is a trigger for acquiring the provision information, an account creation part that creates account data for accessing the mailbox that stores the provision information, on the basis of the identification information, a provision information acquisition part that acquires the provision information stored in the mailbox by using the account data created by the account creation part and a predetermined code, and a display control part that displays the provision information acquired by the provision information acquisition part on a display part, wherein the message transfer agent includes the plurality of mailboxes that are capable of storing different pieces of the provision information respectively, and a provision information transmission part that transmits, to the computer, the provision information stored in the mailbox associated with the received account data, when the account data and the code are received.

A third aspect of the present disclosure provides a non-transitory storage medium for storing a program that causes a computer to function as an identification information acquisition part that acquires identification information that is a trigger for acquiring the provision information, an account creation part that creates account data for accessing a mailbox storing the provision information, on the basis of the identification information, a provision information acquisition part that acquires the provision information stored in the mailbox by using the account data created by the account creation part and a predetermined code, and a display control part that displays the provision information acquired by the provision information acquisition part on a display part.

BRIEF DESCRIPTION OF THE DRAWINGS

FIG. 2 shows an example of a relationship among identification information contained in a beacon, an e-mail account, and provision information.

FIG. 4 shows examples of e-mail accounts created on the basis of reception strengths of beacons.

FIG. 5 shows examples of the e-mail accounts created on the basis of times at which the information terminal receives the beacon.

FIG. 6 shows examples of the e-mail accounts created according to settings of a user.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[Configuration of Information Providing System S]

Figure 1:
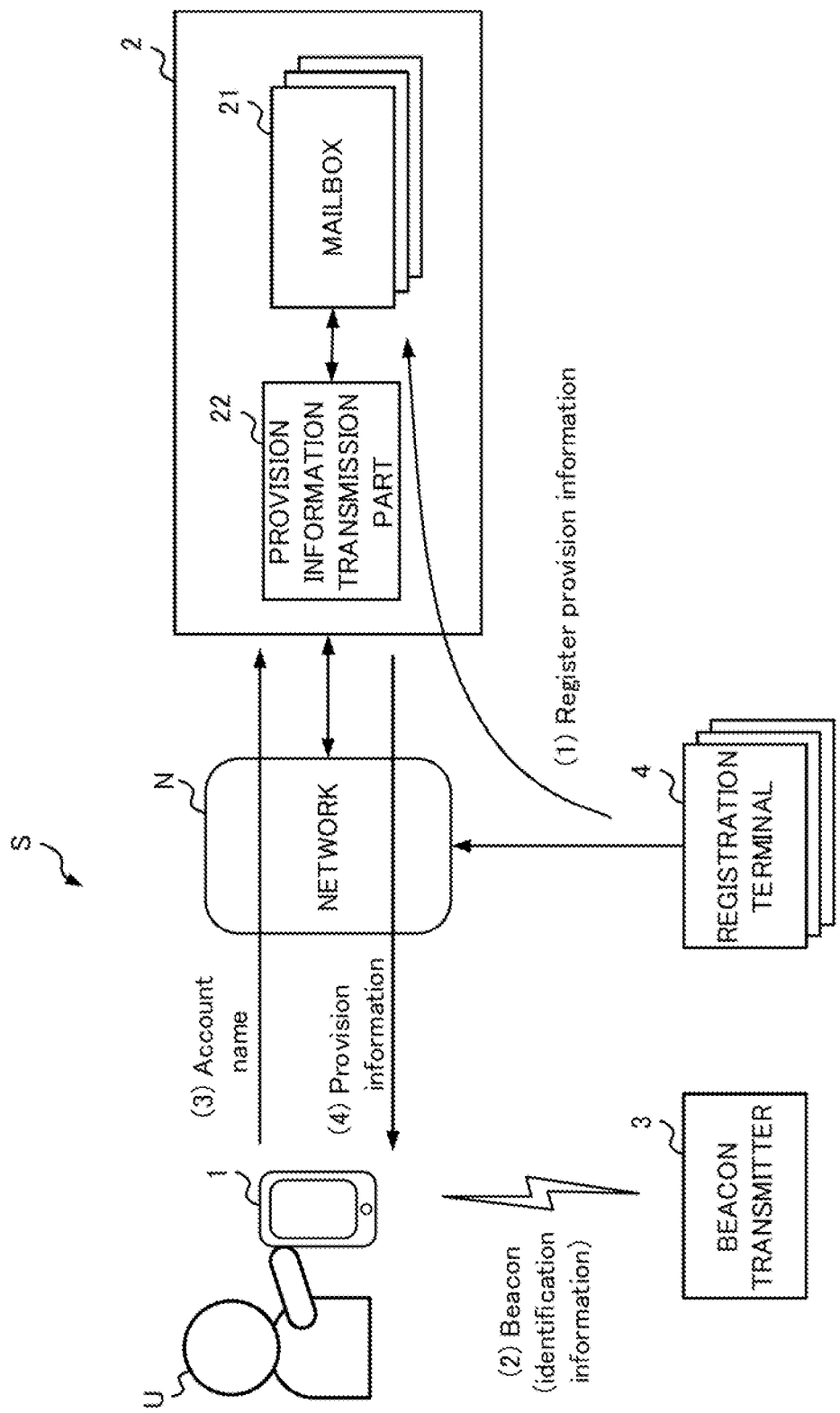
FIG. 1 shows a configuration of an information providing system.

FIG. 1 shows a configuration of an information providing system S. The information providing system S includes an information terminal 1, a mail server 2, a beacon transmitter 3, and a registration terminal 4. The information terminal 1 is a computer with communication and display functions, such as a smartphone or tablet used by a user U who receives information. The information terminal 1 can access the mail server 2 via the network N by executing application software for acquiring provision information, (i.e. information to be provided) which is information to be provided by an information provider, and acquire the provision information stored in advance in the mail server 2. It should be noted that a process of synchronization of the information terminal 1 with the mail server 2 is included in a process of acquisition of the provision information by the information terminal 1.

The mail server 2 is an example of a Message Transfer Agent, and is a computer functioning as an information providing apparatus that can provide the information to the information terminal 1 via the network N when accessed by the information terminal 1 using a communication protocol such as Post Office Protocol (POP) or Internet Message Access Protocol (IMAP). The mail server 2 includes a plurality of mailboxes 21 that can store different pieces of provision information respectively. Different accounts are assigned to the plurality of mailboxes 21 respectively. Further, the mail server 2 includes a provision information transmission part 22 that transmits, when the mail server 2 receives an e-mail address and a predetermined code, the provision information stored in the mailbox 21 associated with an account name included in the received e-mail address, to the information terminal 1. The predetermined code is any text, hash value, image, password, or cryptographic token. There is only one mail server 2 shown in FIG. 1, but the information providing system S may include a plurality of mail servers 2.

The beacon transmitter 3 is a device that transmits a beacon containing predetermined identification information. The beacon transmitter 3 is installed in a place where the information provider wants to provide the information to the user U, for example, a store, company, public office, and the like. The information provider is, for example, a staff member of the store, company, public office, and the like where the beacon transmitter 3 is installed. The identification information is information for identifying the beacon transmitter 3, and includes numbers, alphabet characters, and symbols, for example.

The registration terminal 4 is a terminal used by the information provider, who wants to provide the information to the information terminal 1, to transmit the provision information to the mail server 2 for storage. The registration terminal 4 is a computer or a smartphone, for example. The registration terminal 4 may transmit the provision information to the mail server 2 using dedicated application software, or may transmit the provision information to the mail server 2 using general-purpose e-mail software.

Specifically, the information provider can register the provision information in the mailbox 21 of the mail server 2 by sending an e-mail containing the provision information to the e-mail address including a predetermined account name. In the information providing system S, a large number of information providers can register their pieces of provision information in different mailboxes 21 respectively. The information provider can delete the provision information from the mailbox 21 or update the provision information by accessing the mail server 2 through Post Office Protocol (POP) using the registration terminal 4, for example.

The following is an outline of processing of the information terminal 1 acquiring the provision information from the mail server 2 with reference to FIG. 1. First, as described above, the information provider registers the provision information in the mail server 2 using the registration terminal 4 ((1) in FIG. 1).

The beacon transmitter 3 transmits the beacon containing the predetermined identification information ((2) in FIG. 1). When the user U who uses the information terminal 1 comes close to the beacon transmitter 3, the information terminal 1 creates account data for identifying an account (for example, an e-mail account) on the basis of a predetermined rule using the identification information contained in the received beacon. The information terminal 1 transmits, to the mail server 2, a mail acquisition request that contains (i) an e-mail address including the created account data and (ii) the predetermined code ((3) in FIG. 1).

When the mail server 2 receives the mail acquisition request from the information terminal 1, the mail server 2 transmits the provision information stored in the mailbox 21 corresponding to the account contained in the mail acquisition request, to the information terminal 1 ((4) in FIG. 1). The mail server 2 transmits the provision information stored in the mailbox 21 to the information terminal 1 if the received account data and the code match the information set in advance.

Through the above procedure, the information terminal 1 can acquire and display on its display the provision information corresponding to the beacon transmitted by the beacon transmitter 3. By having the information terminal 1 and the mail server 2 operate as described above, the provision information is displayed on the information terminal 1 when, for example, the user of the information terminal 1 enters the store where the beacon transmitter 3 is installed.

It should be noted that the rule by which the information terminal 1 converts the identification information into the account data is predetermined, for example, by a provider who provides a service for providing the application software for acquiring the provision information (hereinafter, referred to as a "service provider"). In this case, the information provider notifies the service provider about the identification information of the installed beacon transmitter 3 to acquire the account of the mailbox 21 that stores the provision information, from the service provider. For example, the information terminal 1 notifies the service provider of the identification information of the installed beacon transmitter 3, and creates the account data on the basis of the account name acquired from the service provider.

The information provider himself/herself may create the application software for converting the identification information into the account data. In this case, the information terminal 1 stores a relationship between the identification information and the account in advance, and converts the identification information, identified on the basis of the beacon into the account data, by referring to the stored relationship.

FIG. 2 shows an example of a relationship among the identification information contained in the beacon, the e-mail account as an example of the account data, and the provision information. The identification information in FIG. 2 contains information indicating a place where the beacon transmitter 3 is installed. The identification information may be other information, as long as the information is unique to the beacon transmitter 3.

In FIG. 2, different e-mail accounts are associated with different pieces of the identification information respectively. Further, different pieces of the provision information are associated with e-mail accounts respectively. By having the different e-mail accounts be associated with the different pieces of identification information respectively, and having the different pieces of provision information be stored in the mailboxes 21 corresponding to the e-mail accounts respectively in this way, the information terminal 1 can be provided with information suitable for the situation of the information terminal 1 identified by the identification information. It should be noted that the same provision information may be stored in the plurality of mailboxes 21 corresponding to the plurality of e-mail accounts.

[Configuration of Information Terminal 1]

Figure 3:
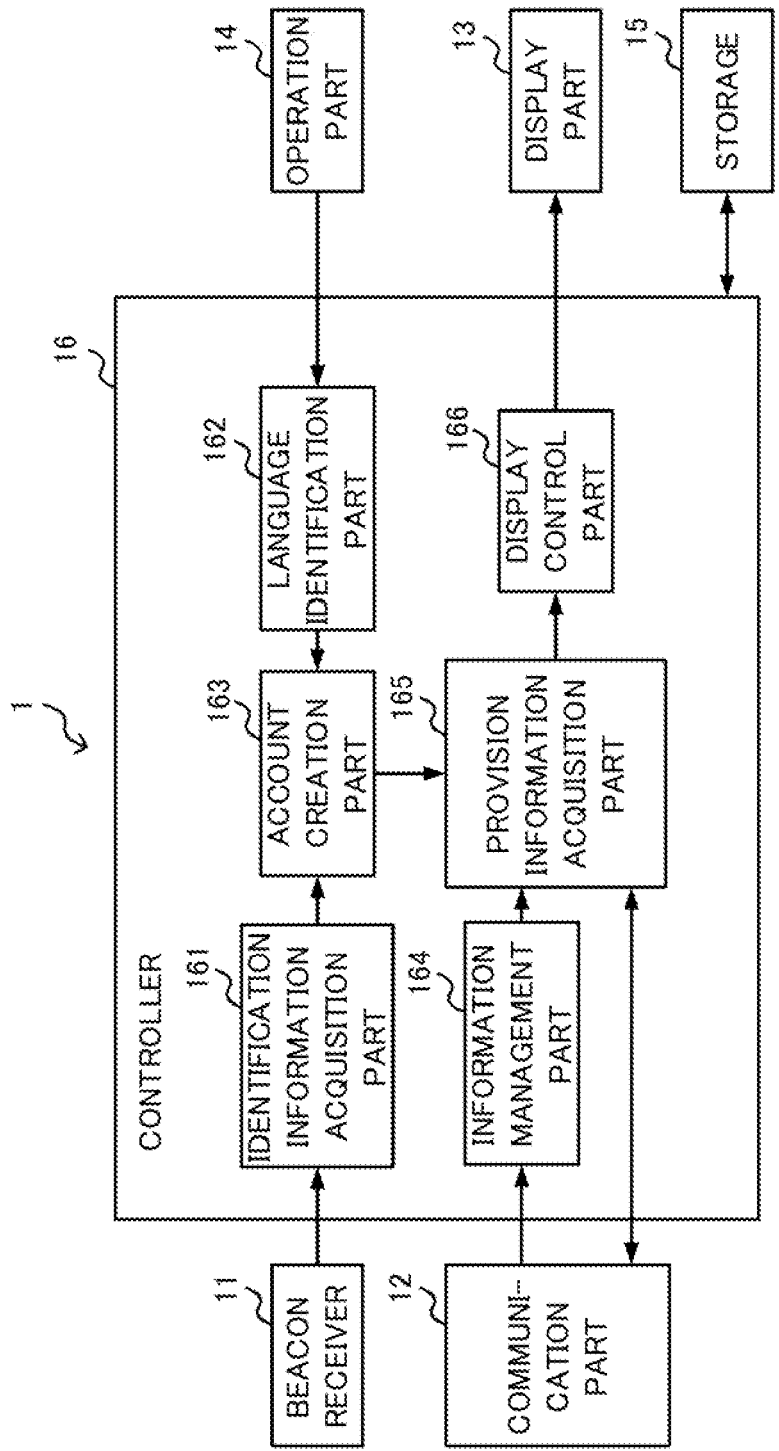
FIG. 3 shows a configuration of an information terminal.

FIG. 3 shows a configuration of the information terminal 1. The information terminal 1 includes a beacon receiver 11, a communication part 12, a display part 13, an operation part 14, a storage 15, and a controller 16. The controller 16 includes an identification information acquisition pan 161, a language identification part 162, an account creation part 163, an information management part 164, a provision information acquisition part 165, and a display control part 166.

The beacon receiver 11 receives the beacon transmitted from the beacon transmitter 3. The beacon receiver 11 extracts information contained in the received beacon, and notifies the identification information acquisition part 161 of the extracted information.

The communication part 12 includes a wireless communication controller for connecting to the network N such as a cellular phone network. The communication part 12 transmits and receives data to and from the mail server 2 via the network N. The communication part 12 sends a message requesting the provision information to the mail server 2 on the basis of an instruction from the provision information acquisition part 165, and inputs the provision information received from the mail server 2 to the provision information acquisition part 165.

The display part 13 is a display for displaying the provision information received from the mail server 2.

The operation part 14 is a device for receiving an operation of the user U. and is a touch panel provided on the display part 13, for example.

The storage 15 is a storage medium including a ROM and a RAM. The storage 15 stores a program executed by the controller 16. Further, the storage 15 stores (a) the identification information contained in the beacon transmitted by the beacon transmitter 3 and (b) the account of the mailbox 21 that stores the provision information corresponding to the beacon transmitter 3, in association with each other. The storage IS may update, under the control of the controller 16, the identification information and the account stored in association with each other, on the basis of the information inputted from an external apparatus.

The controller 16 is a CPU, for example, and functions as the identification information acquisition part 161, the language identification part 162, the account creation part 163, the information management part 164, the provision information acquisition part 165, and the display control part 166, by executing the program stored in the storage 15.

The identification information acquisition part 161 acquires the identification information that is a trigger for acquiring the provision information. The identification information acquisition part 161 extracts the identification information from the information contained in the beacon notified from the communication part 12, for example. The identification information acquisition part 161 notifies the account creation part 163 of the acquired identification information.

The language identification part 162 identifies a language type of the provision information to be acquired. The language identification part 162 identifies the language type on the basis of, for example, language type information inputted by the operation part 14. The language identification part 162 may check the language type with an Operating System (OS) or other application software. The language identification part 162 notifies the account creation part 163 about the identified language type.

The account creation part 163 creates the account data for accessing the mailbox 21 that stores the provision information on the basis of, for example, the identification information contained in the beacon received by the identification information acquisition part 161. The account creation part 163 encrypts the identification information on the basis of the predetermined rule to create the account data. The predetermined rule is a rule for encryption using an encryption key stored in the storage 15, for example. By having the account creation part 163 encrypt the identification information to create the account data, it is possible to prevent a third party who is not using legitimate application software from illegally acquiring the provision information by analyzing the beacon. As described above, the account creation part 163 may convert the identification information into the account data by referring to the information indicating the relationship between the identification information and the account stored in the storage 15.

In addition, the account creation part 163 may create the account on the basis of the language type notified from the language identification part 162. In this case, the account creation part 163 creates different account data for different language types even if the identification information notified from the identification information acquisition part 161 is the same. The accounts differencing by language types correspond to the mailboxes 21 that store the provision information created in the language corresponding to each language type. By having the account creation part 163 operate in this manner, the provision information acquisition part 165 can acquire the provision information written in the language used by the user U.

The account creation part 163 may reference a data format (for example, XML or JSON) acquired by accessing a predetermined URL corresponding to the identification information, to create the account data. In this case, the account creation part 163 may select an account candidate corresponding to a date and time at that point in time (current date and time) from a plurality of account candidates written in association with the date and time in a file, to create the account data to be used by the provision information acquisition part 165. By creating such a file in advance, the information provider can provide the user U with different provision information depending on the date and time.

The information management part 164 manages various kinds of information necessary for receiving the provision information from the mail server 2, on the basis of the identification information. The information management part 164 manages the code for accessing the mailbox 21 corresponding to the identification information, for example. The information management part 164 notifies the provision information acquisition part 165 about the code.

The code managed by the information management part 164 may be any of a code commonly used by a plurality of information terminals 1, a code publicized in advance, a code commonly used by a plurality of accounts, and a code predetermined in the application software executed by the controller 16. The information management part 164 may receive the code commonly used by the plurality of information terminals 1 from a predetermined external apparatus, for example, and store the received code in the storage 15. The information management part 164 may create the code on the basis of the predetermined rule. The information management part 164 may use the account data created by the account creation part 163 as the code, for example.

The provision information acquisition part 165 acquires the provision information stored in the mailbox 21 by using (a) the account data created by the account creation part 163 and (b) the code stored in the storage 15 by the information management part 164. Specifically, the provision information acquisition part 165 transmits the account data and the code to the mail server 2 on the basis of the IMAP, for example. The provision information acquisition part 165 transmits the account data and the code to the mail server 2 to acquire the provision information transmitted from the mailbox 21 corresponding to the account.

The provision information acquisition part 165 acquires the provision information using the predetermined code commonly used in the plurality of information terminals 1, for example. By having the provision information acquisition part 165 use the code common to the plurality of information terminals 1 in this manner, there is no need for the user U to set the code or for the service provider to manage the code for each user U. Therefore, the construction and management of the information providing system S becomes easier.

The provision information acquisition part 165 may acquire the provision information using the code common to the plurality of accounts (for example, a code common to a plurality of beacon transmitters 3). By having the provision information acquisition part 165 use the code common to the plurality of accounts in this manner, there is no need for the information provider to set the code in the mail server 2 at the time when the beacon transmitter 3 is installed or for the user U to set the code.

The provision information acquisition part 165 may acquire the provision information using a publicly available predetermined code that can be acquired from the predetermined external apparatus. The provision information acquisition part 165 uses a code written in the data format (for example, XML or JSON) acquired by accessing the predetermined URL, for example. By having the provision information acquisition part 165 use the publicly available code in this manner, it is not necessary to individually determine the code at the time when the information provider creates the application software to be used in the information terminal 1. Therefore, the information provider who creates the application software can easily create the application software using a predetermined template, for example.

The display control part 166 displays the provision information acquired by the provision information acquisition part 165 on the display part 13. The appearance with which the display control part 166 displays the provision information can be any appearance. For example, the display control part 166 displays the provision information in an area designated by the user U on the display part 13. The display control part 166 may display the provision information in a screen for chatting with the provider of the provision information.

[Another Example of Account Creation]
(Use of Beacon Reception Strength)

Various ways are assumed for the account creation part 163 to create the account data. As an example, the account creation part 163 may create different account data for different reception strengths of the beacons.

FIG. 4 shows examples of the e-mail accounts created on the basis of the reception strengths of the beacons. In the example shown in FIG. 4, different e-mail accounts are created depending on whether the beacon reception strength is "strong," "medium," or "weak" even if the identification information indicates the same store. For example, the account creation part 163 creates different e-mail account for different beacon strength level by adding information indicating the reception strength of the beacon (for example, numerical value) identified by the identification information acquisition part 161, to a common account created on the basis of the identification information.

There is a correlation between the reception strength of the beacon and a distance from a position where the beacon transmitter 3 is installed to the information terminal 1. By using this characteristic, for example, the information provider who has installed the beacon transmitter 3 in the store can provide the user U with the provision information depending on the distance between the information terminal 1 and a sales place where the beacon transmitter 3 is installed, by registering different pieces of provision information in the mailboxes 21 of the accounts that respectively correspond to the reception strengths of the beacons.

In the example shown in FIG. 4, it is assumed that the beacon transmitter 3 is installed in a vegetable section of a store A, which is a supermarket. If the strength of a radio wave received by the beacon receiver 11 in the store A is "weak," it is assumed that the user U is near an entrance of the store A, and therefore, the provision information provided to the information terminal 1 is about an event to be held at the store A. If the strength of the radio wave received by the beacon receiver 11 is "medium," it is assumed that the user U is approaching the vegetable section, and therefore, the provision information provided to the information terminal 1 is about a time sale. If the strength of the radio wave received by the beacon receiver 11 is "strong," it is assumed that the user U is in the vegetable section, and therefore, the provision information provided to the information terminal 1 is about recipes for vegetables being sold. This configuration of the information providing system S allows the user U to acquire the information suitable for the user U's location in the store.

(Use of Beacon Reception Time)

FIG. 5 shows examples of the e-mail accounts created on the basis of times at which the information terminal 1 receives the beacon. For example, the account creation part 163 creates a different e-mail account for reception time of the beacon by adding information associated with a time at which the identification information acquisition part 161 receives the beacon to the common account created on the basis of the identification information. In the example shown in FIG. 5, the e-mail account includes numeric values corresponding to the time of day containing the time at which the identification information acquisition part 161 received the beacon.

For example, the information provider who has installed the beacon transmitter 3 in the store can provide the users U with the provision information depending on the time of day, by registering different pieces of provision information in the mailboxes 21 of the accounts that respectively correspond to reception times of the beacon. In the example shown in FIG. 5, event information is provided from 10 a.m. to 12 noon, and a restaurant guide is provided from 12 noon to 2 p.m. This configuration of the information providing system S allows the user U to acquire useful information at different times of the day.

(Use of User U's Setting)

FIG. 6 shows examples of the e-mail accounts created according to settings of the user U. Different users U may have different types of information they want to receive. For example, some users U want to receive coupon information, while others want to receive time sale information. Therefore, the account creation part 163 may create the e-mail account on the further basis of the type of the provision information that the user U wants to be notified of. The account creation part 163 creates different e-mail accounts depending on a type of the settings, by adding information indicating the type of the settings to the common account created on the basis of the identification information, for example.

In the example shown in FIG. 6, different e-mail accounts are created for the case where the user has made a setting to receive the coupon information and the case where the user has made a setting to receive the time sale information, even if the same beacon is received at the same store A. Specifically, if the user U has made a setting to receive the coupon information, the e-mail account corresponding to the mailbox 21 that stores the coupon information is generated. On the other hand, if the user U has made a setting to receive the time sale information, the e-mail account corresponding to the mailbox 21 that stores the time sale information is generated. By having the account creation part 163 operate in this manner, the information terminal 1 can notify the user U of the provision information that meets the needs of the user U.

It should be noted that, if the user U wants to acquire a plurality of types of information, the account creation part 163 may create a plurality of e-mail accounts corresponding to the plurality of types of information. In this case, the provision information acquisition part 165 acquires the plurality of pieces of provision information from the plurality of mailboxes 21 corresponding to the plurality of e-mail accounts.

(Use of Profile of User U)

The account creation part 163 may create different account data on the basis of a profile of the user U. For example, the account creation part 163 creates the different account data depending on the profile of the user U by adding information indicating the profile of the user U to the common account created on the basis of the identification information. The profile of the user U includes gender, age, hobby, occupation, and the like, for example. The account creation part 163 may use the profile stored in the storage 15 in advance, or may use the profile estimated on the basis of a history of sites accessed by the information terminal 1 or a travel path of the information terminal 1.

[Operation Sequence of Information Providing System S]

Figure 7:
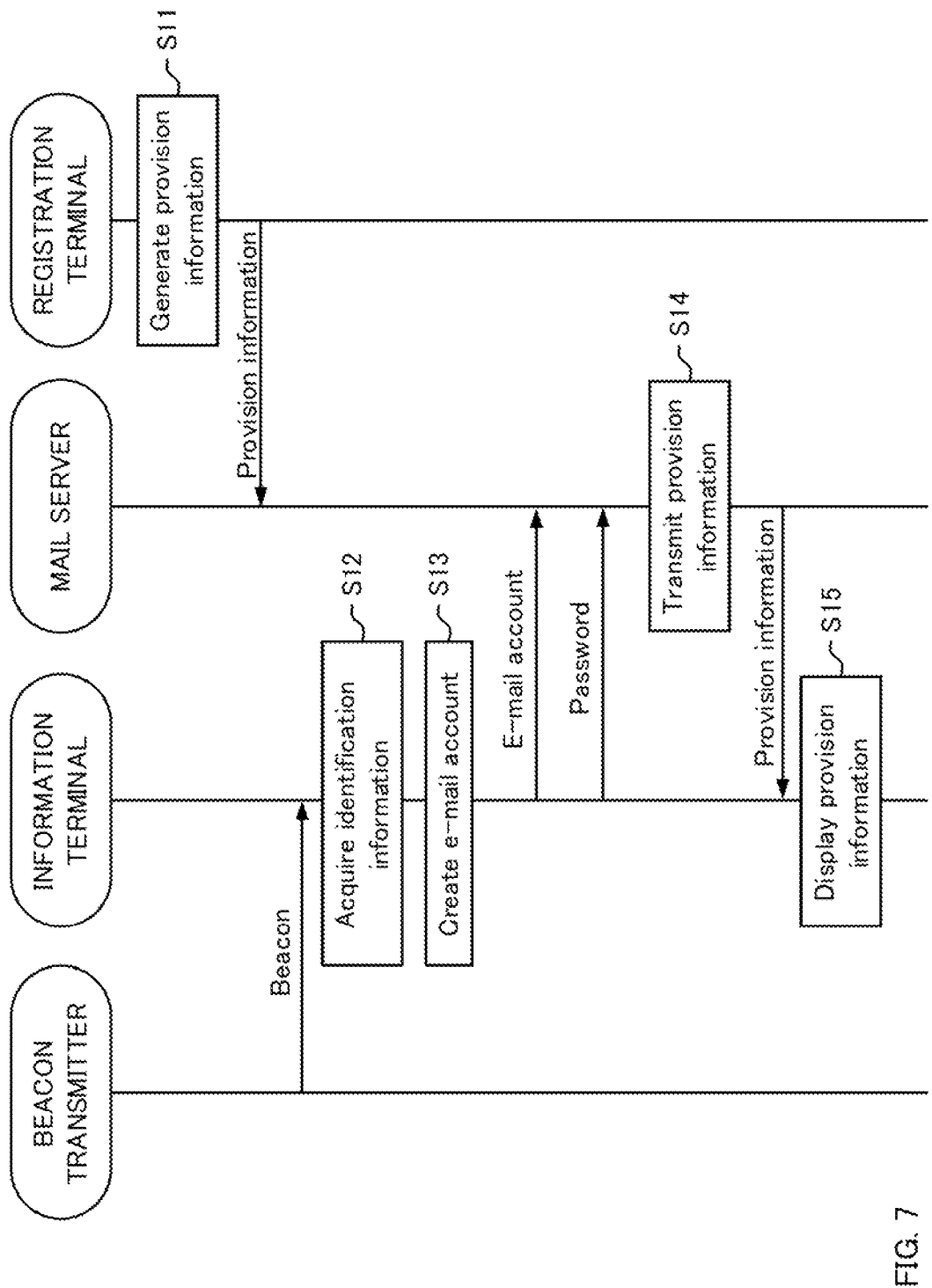
FIG. 7 shows an operation sequence of the information providing system.

FIG. 7 shows an operation sequence of the information providing system S. The sequence diagram shown in FIG. 7 starts when the information provider generates the provision information using the registration terminal 4 (step S11). The information provider transmits the provision information generated in the registration terminal 4 to the account corresponding to the mailbox 21 where the provision information is to be registered. The registration terminal 4 transmits the generated provision information to the mail server 2 to store the provision information in the mailbox 21. The information provider can update the provision information stored in the mailbox 21 by transmitting the provision information at any given time.

On the other hand, the beacon transmitter 3 routinely transmits the beacon that contains the predetermined identification information. The beacon receiver 11 of the information terminal 1 receives the beacon of the beacon transmitter 3, and the identification information acquisition part 161 acquires the identification information contained in the received beacon (step S12). Subsequently, the account creation part 163 creates the e-mail account on the basis of the acquired identification information (step S13). The provision information acquisition part 165 transmits (a) the e-mail address including the created e-mail account and (b) the predetermined code (for example, a password) to the mail server 2.

When the mail server 2 receives the e-mail account and the predetermined code, the mail server 2 determines whether or not the combination of the e-mail account and the code is appropriate. If the mail server 2 determines that the combination of the e-mail account and code is not appropriate, the mail server 2 notifies the information terminal 1 that an error has occurred. If the mail server 2 determines that the combination of the e-mail account and the code is appropriate, the mail server 2 transmits, to the information terminal 1, the provision information stored in the mailbox 21 corresponding to the e-mail account (step S14). The display control part 166 displays the received provision information on the display part 13 (step S15).

[First Variation]

Figure 8:
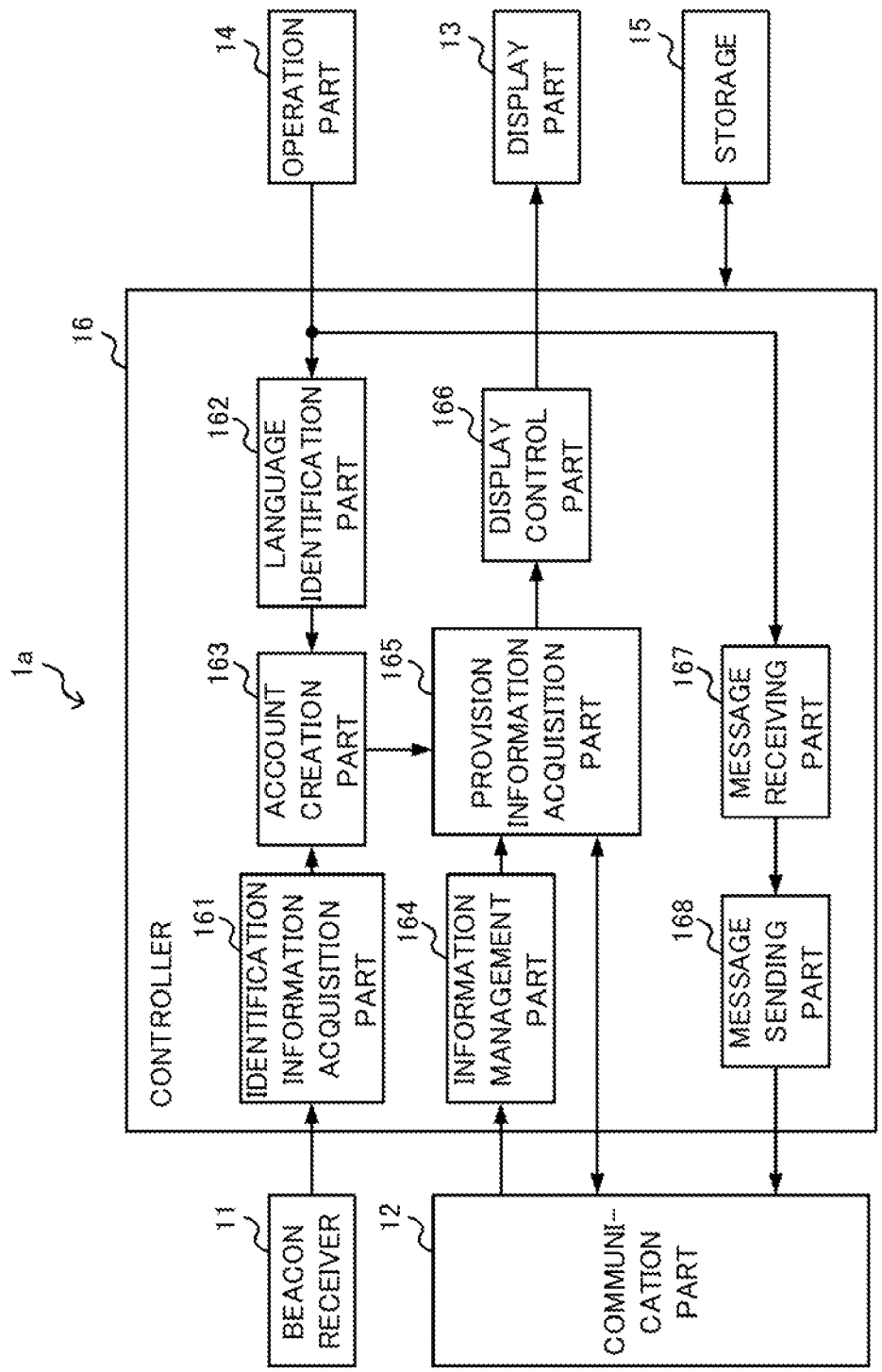
FIG. 8 shows a configuration of an information terminal according to a first variation.

FIG. 8 shows a configuration of an information terminal 1a according to a first variation. The information terminal 1a shown in FIG. 8 differs from the information terminal 1 shown in FIG. 3 in that the information terminal 1a further includes a message receiving part 167 and a message sending part 168, and is the same in other respects. Operations of the message receiving part 167 and the message sending part 168 will be described below.

The message receiving part 167 receives an input of a message via the operation part 14. For example, the message receiving part 167 causes the display part 13 to display a screen for the user U to input the message, and acquires text and images inputted on the screen as the message. The message receiving part 167 may cause the display part 13 to display the screen for inputting the message when the provision information acquisition part 165 acquires the provision information.

The message sending part 168 sends the message received by the message receiving part 167 to the mailbox 21 included in the mail server 2, by using the e-mail account created by the account creation part 163 as the account name for accessing the mailbox 21. The message sending part 168 sends the message to the mailbox 21 by using, for example, the identification information acquired by the identification information acquisition part 161 as the e-mail account. Since the information terminal 1a has the message receiving part 167 and the message sending part 168, for example, the user U who has browsed the provision information can send a question about the provision information to the information provider with easy operation.

It should be noted that the screen for inputting the message, which the message receiving part 167 causes the display part 13 to display, may be a screen for the user U and the information provider to chat. The message receiving part 167 may display a chat-format screen when a predetermined operation is performed after the display control part 166 displays the provision information on the display part 13, to receive the input of the message.

[Second Variation]

Some users U may not want to receive an advertisement among the provision information sent from the mail server 2. It is not desirable for such a user U if the provision information is displayed on the information terminal 1 of the user U. Therefore, when the information terminal 1 is set not to receive advertisements, the information terminal 1 may display only the provision information other than advertisements on the display part 13.

In order to operate the information terminal 1 in this manner, when the information terminal 1 is set not to receive advertisements, the account creation part 163 creates an alternative e-mail account that is alternative account data different from the e-mail account created on the basis of the identification information in the case where advertisements are allowed to be received. The account creation part 163 notifies the provision information acquisition part 165 of the created alternative e-mail account.

The provision information acquisition part 165 uses the alternative e-mail account and the predetermined code to acquire the provision information stored in the mailbox 21 corresponding to the alternative e-mail account. Said provision information is emergency information required to be notified to the user U, for example. By having the information terminal 1 operate in this manner, when the user U does not want to receive advertisements, advertisements will not be displayed on the information terminal 1, and only the information necessary for the user U will be displayed on the information terminal 1 even if the information terminal 1 receives the beacon, thus improving the satisfaction level of the user U.

[Third Variation]

Figure 9:
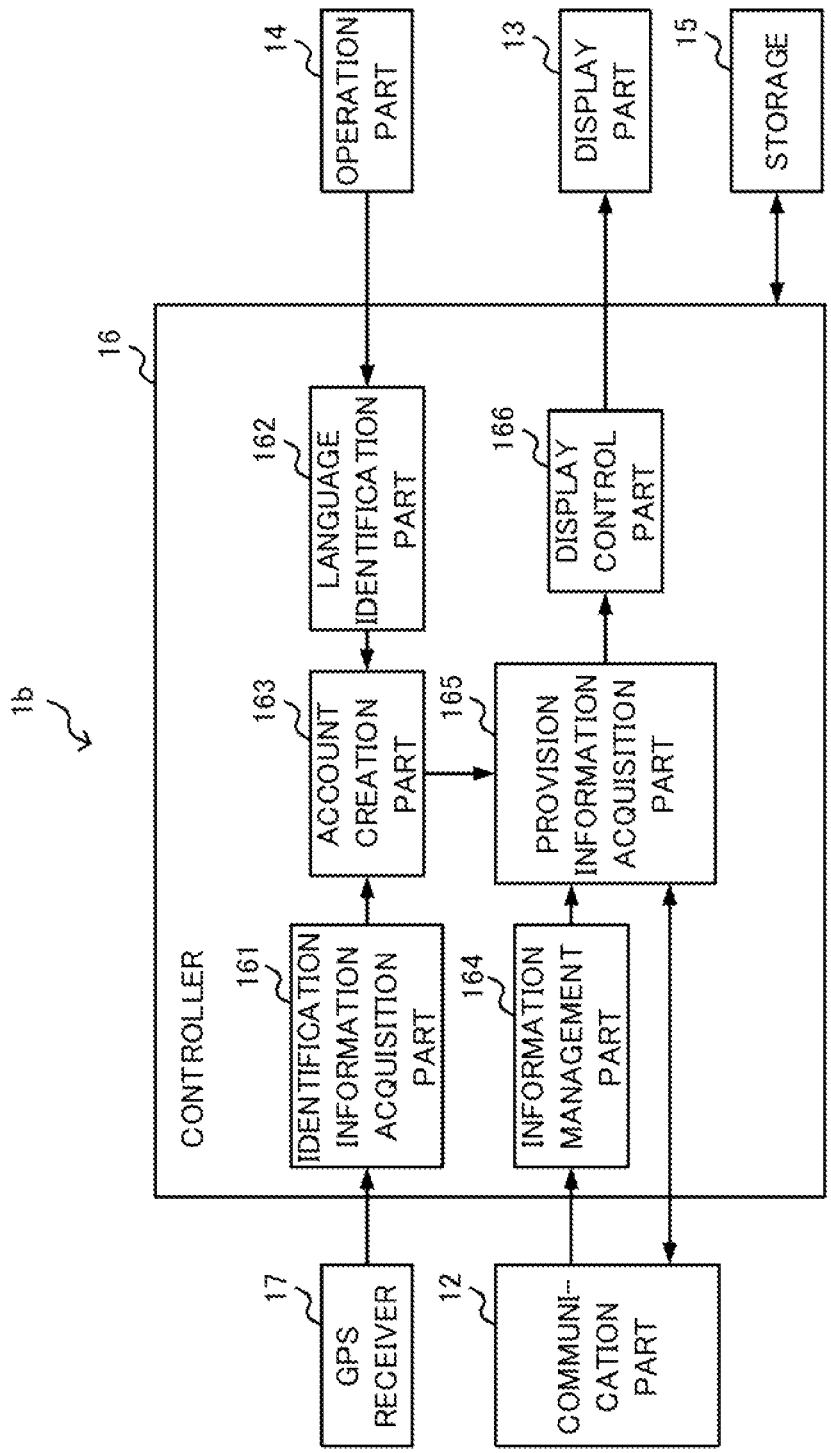
FIG. 9 shows a configuration of an information terminal according to a third variation.

FIG. 9 shows a configuration of an information terminal 1b according to a third variation. The information terminal 1b shown in FIG. 9 differs from the information terminal 1 shown in FIG. 3 in that the information terminal 1b includes a GPS receiver 17 instead of the beacon receiver 11, and is the same in other respects.

The GPS receiver 17 has a function of receiving a radio wave from a satellite of a Global Positioning System (GPS), and generating position information indicating the latitude and longitude of the information terminal 1b on the basis of the received radio wave. The GPS receiver 17 notifies the identification information acquisition part 161 of the position information.

The identification information acquisition part 161 in the information terminal 1b acquires the position information notified from the GPS receiver 17 as the identification information used for acquiring the provision information. The identification information acquisition part 161 may specify an area including the position information notified by the GPS receiver 17 among a plurality of areas registered in advance, and acquire the information for identifying the specified area as the identification information.

Specifically, the application software for providing the information has a table that includes areas and identification information associated with each other in advance, and the identification information acquisition part 161 refers to said table to acquire the identification information on the basis of the position information notified from the GPS receiver. For example, the identification information acquisition part 161 acquires the identification information corresponding to a new area each time the area including the position information is switched.

By having the identification information acquisition part 161 acquire the identification information on the basis of the position information in this manner, the provision information acquisition part 165 can acquire the provision information corresponding to the position of the information terminal 1. As a result, the user U can browse the provision information suitable for his/her location.

It should be noted that the information terminal 1b may further include the beacon receiver 11. In this case, the provision information acquisition part 165 may acquire both (a) the provision information corresponding to the identification information contained in the beacon received by the beacon receiver 11 and (b) the provision information corresponding to the identification information based on the position information notified from the GPS receiver 17.

The provision information acquisition part 165 may acquire only the provision information corresponding to the identification information predetermined by the user U or the information provider, for example, if the beacon is received within a predetermined period of time and the area including the position information is switched. For example, if the beacon receiver 11 receives the beacon, the provision information acquisition part 165 acquires only the provision information corresponding to the identification information contained in the beacon without using the identification information based on the position information. By having the provision information acquisition part 165 operate in this manner, the user U can preferentially browse the provision information desired by the user U or the information provider.

[Fourth Variation]

In the above description, when the provision information acquisition part 165 acquires the provision information, the display control part 166 displays the provision information on the display part 13 such that the user U can browse the provision information. In such a case, a user U who has acquired the account data and the code could fraudulently browse the provision information even if it is not the information that user U should browse.

Therefore, the provision information includes browsing target data (segment data) that defines a range of persons who can browse the provision information, and the display control part 166 may display the provision information on the display part 13 on a condition that the profile of the user U who uses the information terminal 1 is within the range of persons who can browse the provision information indicated by the browsing target data. The registration terminal 4 displays a screen for the information provider to set whether or not to embed the browsing target data, and embeds the browsing target data in a subject area or free area of a header portion of the provision information on the basis of a setting operation of the information provider. The browsing target data is data indicating a user name, division, age, and the like of the user U who is allowed to browse the provision information.

The profile of the user U can be set by the user U himself/herself in the application software of the information terminal 1, for example. By having the information providing system S configured in such a way, only the user U, whom the information provider wants to show the provision information, can browse the provision information. Since the user U does not visually recognize the provision information not suitable for the user U, such a configuration is suitable for the information providing system S that automatically delivers the provision information to the information terminal 1.

[Effect of Information Providing System S]

As described above, in the information providing system S, the information terminal 1 functions as (a) the identification information acquisition part 161 that acquires the identification information that is a trigger for acquiring the provision information, (b) the account creation part 163 that creates the e-mail account for accessing the mailbox 21 that stores the provision information, on the basis of the identification information, and (c) the provision information acquisition part 165 that acquires the provision information stored in the mailbox 21 by using the e-mail account created by the account creation part 163 and the predetermined code. By having the information terminal 1 operate in this manner, the information provider who provides the information can easily provide, without building a dedicated website, the information to the information terminal 1 according to the situation of the information terminal 1, and therefore the burden of the information provider who provides the information is reduced.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. An information providing method comprising the steps, executed by a computer capable of acquiring provision information, of:
   acquiring identification information that is a trigger for acquiring the provision information;
   creating account data for accessing a mailbox that stores the provision information, on the basis of the identification information;
   acquiring the provision information stored in the mailbox by using the created account data and a predetermined code; and
   displaying the acquired provision information on a display part.

2. The information providing method according to claim 1, wherein
   the creating account data creates the account data by encrypting the identification information on the basis of a predetermined rule.

3. The information providing method according to claim 1, further comprising the step of:
   identifying a language type of the provision information to be acquired, wherein
   the creating account data creates a plurality of pieces of the account data that are each different depending on the identified language type.

4. The information providing method according to claim 1, wherein
   the acquiring the provision information uses the predetermined code commonly used by a plurality of computers to acquire the provision information.

5. The information providing method according to claim 1, wherein
   the acquiring the provision information uses the predetermined code commonly used by a plurality of accounts corresponding to a plurality of pieces of the account data, to acquire the provision information.

6. The information providing method according to claim 1, wherein
   the acquiring the provision information uses a publicized predetermined code that can be acquired from a predetermined external apparatus, to acquire the provision information.

7. The information providing method according to claim 1, wherein
   the creating account data creates a plurality pieces of the account data that are each different depending on a strength of a beacon received from a beacon transmitter.

8. The information providing method according to claim 1, wherein
   the creating account data creates a plurality of pieces of the account data that are each different depending on a time at which the beacon from the beacon transmitter is received.

9. The information providing method according to claim 1, wherein
   the creating account data creates the account data on the basis of a predetermined rule using the identification information contained in the beacon received from the beacon transmitter.

10. The information providing method according to claim 1, wherein
    the creating account data notifies a service provider who provides application software for acquiring the provision information of the identification information contained in the beacon received from the beacon transmitter, and creates the account data on the basis of an account name acquired from the service provider.

11. The information providing method according to claim 1, wherein
    the creating account data creates a plurality of pieces of the account data that are each different depending on a type of the provision information that a user of the computer wants to receive.

12. The information providing method according to claim 11, wherein
    the creating account data creates alternative account data different from the account data created on the basis of the identification information when the computer is set not to receive an advertisement, and
    the acquiring the provision information uses the alternative account data and the code to acquire the provision information stored in the mailbox corresponding to the alternative account data.

13. The information providing method according to claim 1, wherein
    the creating account data creates the account data by selecting an account candidate corresponding to the current date and time from among a plurality of account candidates written in association with the date and time in a file received from the external apparatus.

14. The information providing method according to claim 1, further comprising the steps of:
    receiving an input of a message; and
    sending the received message to the mailbox by using the account data created in the creating account data.

15. The information providing method according to claim 1, wherein
    the provision information includes browsing target data defining a range of persons who are allowed to browse the provision information,
    the displaying causes the display part to display the provision information on condition that a profile of the user who uses the computer is within the range of persons who are allowed to browse.

16. The information providing method according to claim 1, further comprising the steps of:
    transmitting, by the computer, the account data and the predetermined code for accessing the mailbox to a message transfer agent; and
    transmitting, by the message transfer agent in response to receiving the account data and the code, the provision information stored in the mailbox associated with the received account data to the computer, wherein the displaying displays the provision information transmitted from the message transfer agent on the display part.

17. The information providing method according to claim 16, wherein
the message transfer agent is a mail server, and
the mail server includes a plurality of the mailboxes capable of storing different pieces of provision information respectively, and accounts corresponding to different pieces of account data are respectively assigned to the plurality of mailboxes.

18. An information providing system comprising:
a computer that is capable of acquiring provision information provided from an information providing apparatus that provides information; and
a message transfer agent that includes a plurality of mailboxes storing the provision information, wherein
the computer includes:
an identification information acquisition part that acquires identification information that is a trigger for acquiring the provision information,
an account creation part that creates account data for accessing the mailbox that stores the provision information, on the basis of the identification information,
a provision information acquisition part that acquires the provision information stored in the mailbox by using the account data created by the account creation part and a predetermined code, and
a display control part that displays the provision information acquired by the provision information acquisition part on a display part, wherein
the message transfer agent includes:
the plurality of mailboxes that are capable of storing different pieces of the provision information respectively, and
a provision information transmission part that transmits, to the computer, the provision information stored in the mailbox associated with the received account data, when the account data and the code are received.

19. A non-transitory storage medium for storing a program that causes a computer to function as:
an identification information acquisition part that acquires identification information that is a trigger for acquiring the provision information;
an account creation part that creates account data for accessing a mailbox storing the provision information, on the basis of the identification information;
a provision information acquisition part that acquires the provision information stored in the mailbox by using the account data created by the account creation part and a predetermined code; and
a display control part that displays the provision information acquired by the provision information acquisition part on a display part.

* * * * *